3,417,040
WAX-POLYMER COMPOSITIONS AND METHOD
OF MAKING SAME
Charles J. Kremer, Brookhaven, Pa., assignor to Atlantic Richfield Company, Philadelphia, Pa., a corporation of Pennsylvania
No Drawing. Continuation-in-part of application Ser. No. 457,218, May 19, 1965. This application June 16, 1966, Ser. No. 557,901
17 Claims. (Cl. 260—27)

ABSTRACT OF THE DISCLOSURE

This invention relates to wax compositions containing an ethylene-vinyl acetate copolymer and an acid component. The acid component must contain at least 35 percent by weight acid and at least 5 percent by weight liquid. The acid can be a liquid and thus satisfy both requirements. If it is a solid, however, it must be utilized in combination with either a liquid acid or a liquid selected from the group consisting of a hydrocarbon oil or a low molecular weight liquid polymer of either styrene, butene or propene. Preferred combinations include wax, ethylene-vinyl acetate copolymer, a liquid styrene polymer, and either rosin acid or dimerized fatty acid. The wax compositions of this invention have improved physical properties especially in the area of tensile, elongation and flex strength.

---

This application is a continuation-in-part of my copending application Ser. No. 457,218, filed May 19, 1965 now abandoned.

This invention relates to the production of improved wax-polymer coating and laminating compositions, and, in another aspect, to the production of these compositions.

Wax has long been used to coat and laminate materials such as paper, paperboard, cardboard, corrugated board, regenerated cellulose, wood, leather goods, metal foil, and similar sheet materials to impart thereto barrier properties such as moisture, vapor and grease resistance, protective properties such as hardness and scuff resistance, and appearance properties such as gloss. Ideally, the wax coating should be tough, hard, flexible, adhesive, glossy, have a low water vapor transmission rate, high grease resistance, and have good anti-blocking and friction properties. As coatings comprised exclusively of wax do not possess all of the desired properties, modified wax compositions containing polymers such as various polyethylenes, propylene- or butyl-rubbers, poly-isobutylenes, polyterpenes and various copolymers of the ethylene-acryl and the ethylene-vinyl families have been developed. However, the addition of the polymer causes an increase in the melt viscosity of the coating which in turn makes processing more difficult. Since the polymer is considerably more expensive than wax, it is also desirable to utilize as low a concentration as possible. Consequently, because of the economic and processing restrictions encountered, manufacturers have not been able to take full advantage of all of the outstanding properties obtainable with wax-polymer coatings.

A particular polymer that is used most successfully in wax-based coating and laminating compositions is ethylene-vinyl acetate copolymer (EVA). Wax compositions containing this copolymer have better tensile strength, elongation, break energy, gloss properties, and the like than coatings comprised exclusively of wax. However, as the amount of copolymer increases the melt viscosity and cost also rise.

Unexpectedly, I have found that the addition of an organic carboxylic acid component to wax—EVA copolymer blends imparts a significant increase in melt viscosity. Consequently, through the practice of this invention, it is possible to lower the copolymer concentration in a coating without reducing the physical properties thereof. This reduction of copolymer concentration is accompanied by a corresponding reduction in coating viscosity.

It is therefore an object of this invention to provide improved wax-polymer coating and laminating compositions.

It is another object of this invention to provide wax-ethylene-vinyl acetate copolymer based coating and laminating compositions that have improved performance properties in conjunction with relatively lower viscosities when the composition is at application temperature.

It is a further object of this invention to provide an improved method for producing these compositions.

In general, the compositions of this invention comprise in parts by weight:
(A) 100 parts of a wax having a melting point greater than 120° F. and,
(B) from about 5 to 150 parts of an ethylene-vinyl acetate copolymer having a polymerized vinyl acetate content ranging from 5 to 35 weight percent and a melt index ranging from .1 to 1000 and,
(C) in an amount sufficient to impart to the composition a total acid number ranging from 5 to 200, a non-corrosive acid component which is compatible with the wax and ethylene-vinyl acetate copolymer at the coating application temperature; said component containing at least 35% by weight acid and at least 5% by weight liquid, said acid and liquid having a boiling point greater than 300° F. at 7 millimeters of mercury and selected from the group consisting of:
  (1) an organic carboxylic acid which is a liquid at 70° F., has a viscosity at 100° F. ranging from 500 to 10,000 SSU, an average molecular weight ranging from 400 to 2500, and an acid number in excess of 20,
  (2) a hydrocarbon which is a liquid at 70° F. selected from the group consisting of:
    (a) an oil having a viscosity at 100° F. ranging from 300 to 3,000 SSU,
    (b) a styrene polymer having a viscosity at 100° F. ranging from 1,000 to 100,000 SSU and an average molecular weight ranging from 300 to 3,000,
    (c) a butene polymer containing at least 90 percent by weight butene, having a viscosity at 100° F. ranging from 1,000 to 1,000,000 SSU and an average molecular weight ranging from 300 to 12,000,
    (d) a propene polymer having a viscosity at 100° F. ranging from 10,000 to 1,000,000 SSU and an average molecular weight ranging from 800 to 3,500,
  (3) an organic carboxylic acid which has a melting point above 70° F., an average molecular weight ranging from 150 to 1500, and an acid number in excess of 20.

The wax component utilized in the composition of this invention can be of mineral, vegetable, animal or synthetic origin or mixtures thereof. The waxes must have a melting point greater than 120° F. Exemplary mineral origin waxes are the petroleum waxes, ozocerite and montan wax, etc. The petroleum and ozocerite waxes are comprised essentially of paraffinic hydrocarbons, whereas the montan wax is comprised essentially of high molecular weight esters, with traces of alcohols and acids also present. Examples of vegetable origin waxes are carnauba, candelilla, Japan waxes and the like. Animal waxes suitable for use in the practice of this invention are beeswax, Chinese wax, insect wax and similar waxes. The main constituent of vegetable and animal origin waxes are high molecular weight esters and saturated hydrocarbons with smaller amounts of higher molecular weight alcohols and acids also being present. Exemplary synthetic waxes are those produced by the esterification with polyhydric alcohols, the hydrogenation of vegetable oils and those made by the Fischer-Tropsch Synthesis.

As noted above, certain waxes are composed of mixtures of chemical compounds which include minor amounts of acids. Generally, however, these waxes do not have an acid number in excess of 20. It is, therefore, necessary that the acid component be added in order to impart the minimum required acid number to the composition.

The use of petroleum waxes represents a preferred embodiment of this invention. These waxes include paraffin waxes which have a melting point from 115° F. to 200° F. and the microcrystalline waxes having a melting point from 140° F. to 210° F. These waxes may be fully refined and thus contain very small amounts of hydrocarbon oils or they may be semi-refined (slack waxes) and have hydrocarbon oil contents of up to about 30 percent.

The most preferred compositions of this invention utilize a wax component containing either 100 percent by weight microcrystalline wax or from 20 to 80 percent by weight of a paraffin wax having a melting point ranging from 120° F. to 180° F. and from 80 to 20 percent of microcrystalline wax having a melting point ranging from 140° F. to 200° F. These wax components provide compositions which may be utilized in high temperature applications. Increasing the concentration of microcrystalline wax will impart a higher maximum use temperature and improve the ultimate physical strength while decreasing dimensional stability. With respect to paraffin waxes as a class the use of a non-normal paraffin wax imparts higher physical strength than the normal base paraffin waxes.

The use of an ethylene-vinyl acetate copolymer is critical to the practice of this invention. This ethylene-vinyl acetate copolymer should have a polymerized vinyl acetate content ranging from 5 weight percent to about 35 weight percent and a melt index ranging from 0.1 to about 1000 (ASTM D1238-62). The preferred ethylene-vinyl acetate copolymers are those having a polymerized vinyl acetate content ranging from 15 weight percent to 35 weight percent and a melt index ranging from about .1 to about 150. The most preferred ethylene-vinyl acetate copolymers contain from 26–29 percent polymerized vinyl acetate and have melt indices ranging from 0.1 to 25.

The concentration of EVA copolymer should be the minimum amount necessary to impart the desired physical properties to the composition. Concentrations ranging from about 5 to about 150 parts by weight per 100 parts of wax are operable. Preferably, the concentration of of copolymer ranges from about 5 to about 100 parts per 100 parts of wax. Most preferably it ranges from 10 to 35 parts per 100 parts wax.

The acid component which is utilized in the practice of this invention must have certain critical properties. First, it must contain at least 35 weight percent of an organic acid having an acid number greater than 20. Secondly, it must contain at least 5 weight percent of an organic liquid. Both the organic acid and the organic liquid must have a boiling point greater than 300° F. at 7 mm. of mercury and both must be compatible with the wax and ethylene-vinyl acetate copolymer at the temperature at which the hot melt coating is being applied. Preferably, the organic acid has an acid number in excess of 30 and is present in the acid component in an amount in excess of 50 weight percent. Preferably, the organic liquid is present in the acid component in an amount in excess of 20 weight percent.

The acid component is incorporated into the compositions of this invention in an amount sufficient to impart thereto an acid number ranging from 5–200. Most preferably, it is present in an amount sufficient to impart an acid number ranging from 10–75. The concentration of acid component necessary to impart the required acid number will, of course, depend on the particular acid and liquid utilized, but generally it ranges from 10 to 150 parts by weight per 100 parts wax. The term, acid number, as used herein, is the number of milligrams of alcoholic potassium hydroxide required to neutralize 1 gram of the composition in the presence of methyl orange.

Subject to the boiling point, compatibility and acid number requirements heretofore set forth, the organic acid which can be utilized in the practice of this invention can be any aliphatic, alicyclic or aromatic acid having one or more carboxyl groups. These acids can be saturated or unsaturated. Exemplary saturated aliphatic carboxylic acids are nonanoic acid, lauric acid, tetradecanoic acid, pentacosanoic acid, natural occurring acids such as for example coconut fatty acid and tallow fatty acid, sebacic acid, 2-butyl-2-ethyl glutaric acid, and 2-propyl-1-2,4-pentane tricarboxylic acid. Exemplary unsaturated aliphatic carboxylic acids are oleic acid, linoleic acid, linolenic acid, and 5 - octene - 3,3,6 - tricarboxylic acid. Exemplary saturated alicyclic carboxylic acids are the naphthenic acids (cycloparaffinic acids), including those which have one or more alkyl side chains of varying length such as cyclohexane pelargonic acid. Exemplary unsaturated alicyclic carboxylic acids are abietic acid and acids obtained by dimerizing or trimerizing higher molecular weight unsaturated fatty acids such as for example, oleic or linoleic acid. Aromatic acids such as for example naphthoic, anthroic, alkyl substituted phthalic acid, and alkyl substituted naphthalic acid can also be used in the practice of this invention.

Carboxylic acids that contain other functional groups such as aldehyde, keto or hydroxyl groups can also be used in the compositions of this invention provided, however, that the functional group does not hinder the carboxyl moiety. Consequently, acids such as 12-hydroxystearic acid and oxidized petroleum waxes, having an acid number in excess of about 20, can be also utilized in the compositions of this invention. Acids containing small proportions of other elements such as nitrogen, sulfur, oxygen, phosphorous etc. can also be utilized provided the additional elements do not hinder the carboxyl moiety.

While the acid component must contain both an acid and a liquid, both of these requirements can be satisfied by utilizing an organic carboxylic acid which is also a liquid at 70° F. On the other hand, both liquid organic acids and liquid organic non-acids can be used in the same composition if desired. For example, liquid acids such as the oligomers of fatty acids can be utilized alone or with a solid organic acid or a liquid organic non-acid. If a liquid organic carboxylic acid is used, it must have a melting point below 70° F., have a viscosity at 100° F. ranging from 500–10,000 SSU, have a molecular weight ranging from 400–2,500 and have an acid number in excess of 20. Preferably, the acid has a viscosity at 100° F. ranging from 500–2,000 SSU and an average molecular weight ranging from 400–800. Preferred liquid acids are the dimerized and trimerized fatty acids containing from 16–22 carbon atoms; for example, dimerized or trimerized oleic, arachidonic, sorbic or eicosenic acids. Most preferred are the dimerized, and trimerized eighteen carbon fatty acids such as dimerized or trimerized oleic or linolenic acids.

Organic carboxylic acids which are not liquids at 70° F. can be utilized if combined with at least 5 weight percent of an organic liquid. This solid organic carboxylic acid must have an average molecular weight ranging from 150 to 1500 and an acid number in excess of 20, Preferably, this acid has an average molecular weight ranging from 400–800 and has a melting point ranging from 120°–200° F. A preferred solid organic carboxylic acid is abietic acid which is commonly found in wood rosins. This acid can be subjected to such chemical treatments as isomerization, air oxidation, hydrogenation, disproportionation or dimerization to alter its properties for the particular application desired. Consequently, the use of treated or untreated rosin acids represents a preferred embodiment of this invention.

The organic liquids which can be utilized in the practice of this invention must be liquids at 70° F. and have a boiling point greater than 300° F. at 7 millimeters of mercury. As previously stated, the acid component must contain at least 5 percent of a liquid organic acid or a liquid organic non-acid. If a liquid organic non-acid is utilized it must be a hydrocarbon compound selected from the group consisting of oils or a styrene, butene or propene polymer.

The oil which can be utilized as an organic liquid can be any hydrocarbon oil having a viscosity at 100° F. ranging from 300–3,000 SSU. Preferably, the oil has a viscosity at 100° F. ranging from 500–1,500 SSU. The most preferred oil is a refined white oil.

The styrene polymers which can be utilized as the organic liquid in this invention must have a viscosity at 100° F. ranging from 1,000–100,000 SSU and an average molecular weight ranging from 300–3,000. Preferably, the viscosity at 100° F. ranges from 800 to 3,500 SSU and the average molecular weight ranges from 300–1,500. These polymers can also be prepared by polymerizing various styrene monomers to produce low molecular weight polymers. A mixture of styrene monomers can be polymerized. For example, suitable polymers can be derived from styrene, alpha methyl styrene or alkylated styrenes such as alkylated alpha-methyl styrene, alkylated alpha-methyl para-methyl styrene, or alkylated para-methyl styrene or mixtures thereof. A particularly suitable polymer of this type is produced by the simultaneous alkylation and polymerization of monomeric styrene, alpha-methyl styrene alpha-methyl+para-methyl styrene, para-methyl styrene or a mixture of these monomers.

The butene polymers which can be utilized as the organic liquids in this invention must contain at least 90 percent by weight butene and have a viscosity at 100° F. ranging from 1000 to 1,000,000 SSU and an average molecular weight ranging from 300–12,000. Copolymers containing butene and up to 10 percent of another lower mono-olefin can also be utilized. Preferably the butene polymer is a homopolymer which has a viscosity at 100° F. ranging from 10,000 to 200,000 and an average molecular weight ranging from 800–3,000. Most preferably the average molecular weight ranges from 1,600 to 2,500. The most preferred butene polymer is one prepared by the homopolymerization of isobutylene.

The propene polymer which can be utilized as an organic liquid in this invention has a viscosity at 100° F. ranging from 10,000–1,000,000 SSU and an average molecular weight ranging from 800–3,500. Preferably, this polymer has a viscosity at 100° F. ranging from 20,000 to 50,000 SSU and an average molecular weight ranging from 1,000 to 2,000.

Preferred compositions can be prepared by utilizing as the acid component a mixture of rosin acid and dimerized fatty acids or a mixture of rosin acid and styrene polymer. For example, the acid component can contain from 70 to 95 percent by weight rosin acid and from 5 to 30 percent by weight of a dimer of 9,12-octadecadienoic acid or a styrene homopolymer.

Ingredients commonly added to wax or ethylene-vinyl acetate copolymers can be incorporated into the compositions of this invention in functional amounts without departing from the scope thereof. Examples of these ingredients include but are not limited to: heat and ultraviolet light stabilizers, inert fillers, secondary plasticizers, antiblocking agents, pigments and colorants, anti-oxidants, gloss stabilizers, viscosity-index improvers, solvents, antiscuff agents, etc. Specifically, ingredients such as the solid glycol esters of rosin acids can be added to improve color, odor and heat stability.

The preparation of the compositions of this invention is not critical to the practice. For example, these compositions can be prepared by heating the wax to a temperature above its melting point, adding the ethylene-vinyl acetate copolymer, acid component and other additives and agitating vigorously until a homogeneous hot melt is obtained. It has been found, however, that the acid component facilitates the dispersion of the copolymer. Therefore, if this method is used it is preferable to incorporate the acid component into the melted wax prior to the addition of the copolymer. A specific method for preparation is as follows: the waxes are melted together, any anti-oxidants or heat stabilizers are added and the melt is then brought to a temperature about 275° F. The acid component is heated to about 275° F. and added to the hot melt. The ethylene-vinyl acetate copolymer is then added to the melt accompanied by vigorous stirring while maintaining the melt temperature above about 275° F. After all of the copolymer has been added, the melt temperature is raised to about 310° F. and agitated until the composition is homogeneous.

It has been found that mixing time and heat requirements can be greatly reduced by first preparing a concentrate composed of the copolymer and acid component and then mixing this concentrate into molten wax. This method is referred to in Example IV as the master batch method. In addition to reduced energy and heat requirements the resulting compositions have improved physical properties over those prepared by conventional methods. Generally, the improved process comprises admixing:

(a) a homogeneous blend prepared by combining at a temperature ranging from 250° to 400° F. of:
(1) from 5 to 150 parts of an ethylene-vinyl acetate copolymer having a polymerized vinyl acetate content ranging from 5 to 35 weight percent and a melt index ranging from .1 to 1000 and,
(2) in an amount sufficient to impart to the composition a total acid number ranging from 5 to 200, a non-corrosive acid component which is compatible with the wax and ethylene-vinyl acetate copolymer at the coating application temperature, said component containing at least 35 percent by weight acid and at least 5 percent by weight liquid, said acid and liquids having a boiling point greater than 300° F. at 7 millimeters of mercury and selected from the group consisting of:
(1) an organic carboxylic acid which is a liquid at 70° F., has a viscosity at 100° F. ranging from 500 to 10,000 SSU, an average molecular weight ranging from 400 to 2500, and an acid number in excess of 20,
(2) a hydrocarbon which is a liquid at 70° F. selected from the group consisting of:
(a) an oil having a viscosity at 100° F. ranging from 300 to 3,000 SSU,
(b) a styrene polymer having a viscosity at 100° F. ranging from 1,000 to 100,000 SSU and an average molecular weight ranging from 300 to 3,000,
(c) a butene polymer containing at least 90 percent by weight butene, having a viscosity at 100° F. ranging from 1,000 to 1,000,000 SSU and an average molecular weight ranging from 300 to 12,000,
(d) a propene polymer having a viscosity at 100° F. ranging from 10,000 to 1,000,000 SSU and an average molecular weight ranging from 800 to 3,500, (3) an organic carboxylic acid which has a melting point above 70° F., an average molecular weight ranging from 150 to 1500, an acid number in excess of 20, with (b) 100 parts of a molten wax at a temperature ranging from 150° F. to 275° F. and agitating until a homogeneous blend is obtained.

It will be noted that in the examples the performance characteristics of many of the compositions have been rated by a 180° F. Flex number. This number was obtained from a "180° Flex Life Test" which has been developed to evaluate simultaneously the flexibility and cohesive properties of wax-polymer compositions. The test procedure involves subjecting the composition in the form of injection molded short strips (½" x 1 9/16" and approximately 70 mils thick), that have been aged 24 hours at 72° F. and 55 percent relative humidity, to repeated 180° angle bends. This is accomplished by mounting the molded strips in a holding bracket which is attached to a reciprocating device. This device is placed above a freely rotating fixed position roller of 1.5" diameter. The roller is mounted parallel to and directly below the holding bracket which cycles two inches to each side of the roller. The bracket with the specimens mounted reciprocates horizontally over the top of the roller wiping the specimens across the roller. The specimens are flexed through repeated 180° bends at a rate of 25, four inch long horizontal cycles per minute at a temperature of 72° F. and a relative humidity of 55 percent. A strong light is placed directly behind the bracket to facilitate the determination of the end point which is taken as the number of 180° flexes recorded before a crack appears anywhere across the test area. This crack must be completely through the test strip as indicated by the light shining through the cracked area. The "180° Flex number" is the average number of flexes that six test strips have endured before the above-described end point is reached.

The following examples are given to illustrate the various embodiments of this invention and should not be construed as limitations on the invention. All parts and percents are by weight.

EXAMPLE I

The compositions included in Table I below are illustrative of various acid components that can be employed in the practice of this invention and also are indicative of the improved flexibility and cohesive properties obtained thereby. The compositions containing the acid component were prepared by combining the copolymer and acid component at 275° F. and agitating vigorously with a 10,000 r.p.m. homo-mixer for about 10 minutes until a homogeneous blend was obtained. This concentrate was then cooled to 70° F. and added uniformly to the molten wax which had been heated to a temperature of 230° F. The wax-concentrate mixture was raised to and maintained at a temperature of 250° F. for about 3 minutes until a homogeneous blend was obtained. The compositions which did not contain an acid component were prepared by heating the wax to a temperature of 275° F. and adding the ethylene-vinyl acetate copolymer. This mixture was agitated vigorously and maintained at a temperature ranging from 270° F. to 300° F. for a period of 2½ hours, at which time a homogeneous blend was obtained.

TABLE I

| Formulation No. | 1 | 2 | 4 | 4 | 5 | 6 | 7 |
|---|---|---|---|---|---|---|---|
| Components in parts by weight: | | | | | | | |
| Paraffin wax [1] | 83.1 | 77 | 90 | 90 | 90 | 90 | 90 |
| Microcrystalline wax [2] | 16.9 | 23 | 10 | 10 | 10 | 10 | 10 |
| Ethylene-vinyl acetate copolymer [3] | 5.3 | 5.7 | 6.3 | 5.1 | 6.3 | 6.3 | 5.5 |
| Polymer of styrene [4] | | 8.6 | 9.4 | 7.7 | | 9.4 | |
| Alkylated polystyrene [5] | | | | | 9.4 | | |
| 12-hydroxystearic acid [6] | | | 9.4 | | | | |
| Dimerized 9,12-octadecadienoic acid [7] | | | | 7.7 | | | 8.3 |
| Rosin acid [8] | | | | | 9.4 | 9.4 | 9.3 |
| Test Results: | | | | | | | |
| Acid Number (ASTM D664-58) | <0.1 | <0.1 | 13.7 | 13.6 | 12.5 | 12.5 | 24.0 |
| Viscosity at 250° F., cp | 17.3 | 17.9 | 20.9 | 20.4 | 17.1 | 17.3 | 17.5 |
| Tensile yield, p.s.i.[9] | 310 | 395 | 378 | 421 | 549 | 560 | 485 |
| Elongation, percent | 0.7 | 4.1 | 9.1 | 7.4 | 17.1 | 16.7 | 10.0 |
| Break Energy, ft.lb./cu.in | 0.30 | 0.98 | 1.51 | 1.47 | 4.50 | 4.70 | 2.44 |
| 180° Flex No. | 0 | 0.5 | 0.5 | 0.5 | 2.0 | 1.5 | 0.5 |
| Seal Strength, gr./in.: | | | | | | | |
| Sulfite/sulfite | 60 | 85 | 98 | 120 | 137 | 140 | 95 |
| Sulfite/alumin. foil | 45 | 105 | 64 | 142 | 270 | 262 | 143 |
| Sulfite/K-Cellophane | 0 | 33 | 105 | 60 | 45 | 42 | 41 |

[1] Refined paraffin wax, melting point, 150° F. (ASTM D-87).
[2] Microcrystalline wax, melting point, 175° F. (ASTM D-127).
[3] Bound vinyl acetate content, 28 weight percent, melt index, 3.0.
[4] A viscous liquid polystyrene; initial boiling point of 310° F. at 7 mm. of Hg pressure, average molecular weight 325 to 350, specific gravity of about 1.03 and a viscosity at 100° F. of approx. 1,500 SSU.
[5] A liquid polymer of styrene alkylated with a $C_8$ wax olefin; at 7 mm. of Hg pressure, initial boiling point, 302° F., 59% distills over at 600° F. at 7 mm. Hg is compatible with wax at 200° F. having an average molecular weight of 750 and a viscosity at 100° F. of 2,000 SSU.
[6] Melting point, 172° F., Acid No. 225.
[7] Melting point, 35° F., Acid No. 190 and a viscosity at 100° F. of 1,000 SSU.
[8] High degree of disproportionated wood rosin; melting point of 181° F. (Ring and Ball); acid number of 154; saponification number of 189 and an average molecular weight of 450.
[9] The tensile, elongation and break energy were determined by ASTM D1708-59T using injection molded rather than milled specimens.

Formulation Nos. 3 to 7 clearly show that compositions with the acid component have better plastic-like and sealing properties than the base compositions in Formulation Nos. 1 and 2. It is highly unusual and surprising that property improvements of such a high degree can be obtained at such low copolymer concentrations. The compositions of this invention illustrated in Table I would find use in applications such as for instance, ice cream carton coatings.

EXAMPLE II

The formulations included in Table II below illustrate the improved barrier properties, in addition to the plastic-like and sealing properties, of the compositions of this invention. These compositions were prepared in essentially the same manner described in Example I. The components are as defined in Table I.

TABLE II

| Formulation No. | 8 | 9 | 10 | 11 | 12 | 13 | 14 |
|---|---|---|---|---|---|---|---|
| Components in parts by weight: | | | | | | | |
| Paraffin wax | 86.5 | 93.5 | 90.0 | 90.9 | 90.5 | 90.5 | 89.7 |
| Microcrystalline wax | 13.5 | 6.5 | 10.0 | 9.1 | 9.5 | 9.5 | 10.3 |
| Ethylene-vinyl acetate copolymer | 12.4 | 14.5 | 16.7 | 13.0 | 14.7 | 14.7 | 11.8 |
| Polymer of styrene | | 17.1 | 25.0 | 19.9 | | 22.0 | |
| Alkylated polystyrene | | | | | 22.0 | | |
| 12-hydroxystearic acid | | | | 25.0 | | | |
| Dimerized 9,12-octadecadienoic acid | | | | | 19.9 | | 17.8 |
| Rosin acid | | | | | | 22.0 | 17.8 |
| Test Results: | | | | | | | |
| Acid Number (ASTM D664-58) | <0.1 | <0.1 | 19.3 | 22.7 | 22.5 | 22.5 | 46.8 |
| Viscosity at 250° F., cp | 103 | 104.3 | 100.5 | 106 | 98.5 | 100 | 99.5 |
| Tensile yield, p.s.i | 350 | 498 | 447 | 557 | 560 | 571 | 639 |
| Elongation, percent | 1.0 | 8.0 | 9.7 | 11.7 | 39.1 | 38.5 | 17.7 |
| Break energy ft. lb./cu. in | 1.20 | 2.41 | 3.41 | 3.49 | 9.71 | 9.67 | 5.81 |
| 180° Flex No | 0 | 2 | 4 | 7 | 334 | 308 | 47 |
| Seal Strength, gr./in.: | | | | | | | |
| Sulfite/sulfite | 100 | 150 | 157 | 131 | 400 | 407 | 487 |
| Sulfite/Alum. foil | 60 | 164 | 141 | 127 | 418 | 431 | 307 |
| Sulfite/K-Cellophane | 20 | 47 | 95 | 47 | 85 | 88 | 97 |
| Water Vapor Transmission rate, gr./100 sq. in./24 hrs | 4.00 | 1.60 | | | | 0.38 | 0.84 |
| Grease Proofness at 73° F., flat, one side coated, hrs | 14 | 34 | | | | 168+ | 168+ |

The compositions of formulation Nos. 10 to 14 when compared to the base compositions of formulation Nos. 8 and 9 further show the effectiveness of the acid component in improving the plastic-like, sealing-, and barrier-properties of the compositions and accomplishing this at lower polymer concentrations and viscosity levels. For example, formulation No. 13 contains essentially the same amount of ethylene-vinyl acetate copolymer as formulation No. 9 yet it has 14 percent more tensile strength, 380 percent more elongation, 300 percent more break energy, 15,200 percent higher flex number, an average of 130 percent more seal strength and 500 percent more grease proofness. Furthermore, this tremendous improvement is accompanied by a slight reduction in melt viscosity. The compositions included in Table II would find use, for instance, in heat sealable carton or corrugated cardboard coating applications.

EXAMPLE III

The compositions included in Tables III, IV, V and VI below are further evidence that the components of the compositions of this invention may be blended over a wide range of proportions and that quite remarkable improvements in properties are obtained at the higher copolymer concentrations. These compositions were prepared in the same manner as those described in Example I with one exception. After a homogeneous blend of the concentrate was prepared, its temperature was cooled to about 250° F. at which time it was added to the molten wax. (In the compositions of Tables I and II, the temperature of the concentrate was at room temperature when it was added to the molten wax.) After addition of the concentrate to the molten wax, it took about one-half hour of stirring until a homogeneous blend was obtained.

TABLE III-A

| Formulation No. | 15 | 16 | 18 | 19 | 20 | 21 | 22 | 23 | 24 |
|---|---|---|---|---|---|---|---|---|---|
| Paraffin Wax [1] | 83 | 83 | 83 | 83 | 83 | 83 | 83 | 83 | 83 |
| Microcrystalline Wax [2] | 17 | 17 | 17 | 17 | 17 | 17 | 17 | 17 | 17 |
| EVA Copolymer [3] | 7.5 | 7.5 | 7.5 | 7.5 | 7.5 | 12.4 | 12.5 | 12.5 | 15.0 |
| Rosin Acid [8] | 13.7 | 13.7 | 13.7 | 16.2 | 16.2 | | 10.0 | 10.0 | 5.0 |
| Organic Liquid: | | | | | | | | | |
| White Oil [11] | 3.8 | | | 1.3 | | | 2.5 | | 5.0 |
| Dimerized Acid [7] | | 3.8 | | | 1.3 | | | 2.5 | |
| Solvent Oil [10] | | | 3.8 | | | | | | |
| Test Results: | | | | | | | | | |
| Acid Number (ASTM D664-58) | 15.9 | 23.3 | 17.3 | 19.9 | 26.2 | <0.1 | 17.3 | 22.3 | 6.0 |
| Viscosity at 250° F., cp | 33 | 33 | 33 | 33 | 33 | 103 | 103 | 103 | 168 |
| Tensile at Break, p.s.i. [9] | 297 | 400 | 357 | 405 | 373 | | 425 | 407 | 393 |
| Tensile at yield, p.s.i | 317 | 400 | 340 | 405 | 373 | 350 | 425 | 407 | 393 |
| Percent Elongation | 11.1 | 8.9 | 13.7 | 7.4 | 4.1 | 1.0 | 12.4 | 7.4 | 6.0 |
| Break Energy, ft. #/in.[3] | 2.4 | 2.3 | 3.8 | 2.0 | 0.9 | 1.2 | 3.4 | 1.8 | 1.6 |
| Hardness at 110° F. (ASTM 1321) | 22 | 20 | | 19 | 18 | | 19 | 19 | 20 |

See footnotes at bottom of Table III B.

TABLE III-B

| Formulation No. | 25 | 26 | 27 | 28 | 29 | 30 | 31 | 33 | 34 |
|---|---|---|---|---|---|---|---|---|---|
| Paraffin Wax [1] | 83 | 83 | 83 | 83 | 83 | 83 | 83 | 83 | 83 |
| Microcyrstalline Wax [2] | 17 | 17 | 17 | 17 | 17 | 17 | 17 | 17 | 17 |
| EVA Copolymer [3] | 15.0 | 15.0 | 16.6 | +16.6 | 40.0 | 75.0 | 75.0 | 75.0 | 37.5 |
| Rosin Acid [8] | 5.0 | 5.0 | 30.0 | 40.0 | 10.0 | 52.5 | 52.5 | 30.0 | 75.0 |
| Organic Liquid: | | | | | | | | | |
| White Oil [11] | | | 20.0 | 10.0 | 16.7 | 22.5 | | 45.0 | |
| Dimerized Acid [7] | 5.0 | | | | | | 22.5 | | 37.5 |
| Solvent Oil [10] | | 5.0 | | | | | | | |
| Test Results: | | | | | | | | | |
| Acid Number (ASTM D664-58) | 12.6 | 6.6 | 30.6 | 27.8 | 9.1 | | 58.9 | 22.2 | 48.4 |
| Viscosity at 250° F. cp | 168 | 168 | 143 | 165 | 2,900 | 15,800 | 17,000 | 13,250 | 1,200 |
| Tensile at Break, p.s.i. [9] | 472 | 400 | 201 | 135 | 497 | 513 | 519 | 408 | 140 |
| Tensile at yield, p.s.i | 472 | 400 | 209 | 329 | 516 | 536 | 524 | 421 | 297 |
| Percent Elongation | 9.0 | 8.3 | 17.7 | 48.7 | 23.8 | 323 | 630 | 28.0 | 75.8 |
| Break Energy, ft. #/in.[3] | 2.6 | 2.2 | 2.5 | 12.0 | 8.0 | 135.3 | 275.8 | 7.95 | 14.9 |
| Hardness at 100° F. (ASTM 1321) | 15 | | 47 | 36 | 22 | 28 | 20 | 27 | 37 |

[1,2,3,4,7,8,9] as defined in Table I. [10] A solvent bright stock hydrocarbon oil having a viscosity at 100° F. of 2,770 SSU. [11] A fully refined hydrocarbon white oil having a viscosity at 100° F. of 500 SSU.

TABLE IV-A

| Formulation No. | 36 | 37 | 38 | 39 | 40 | 41 | 42 | 43 | 44 | 45 | 46 |
|---|---|---|---|---|---|---|---|---|---|---|---|
| Paraffin Wax [1] | 83 | 83 | 83 | 83 | 83 | 83 | 83 | 83 | 83 | 83 | 83 |
| Microcrystalline Wax [2] | 17 | 17 | 17 | 17 | 17 | 17 | 17 | 17 | 17 | 17 | 17 |
| EVA Copolymer [3] | 15.0 | 16.0 | 13.3 | 16.6 | 16.6 | 20.0 | 17.3 | 19.3 | 17.3 | 20.0 | 15.7 |
| Polyethylene [15] | 3.3 | 6.7 | | | | | | | | | 4.0 |
| Rosin Acid [8] | 30.0 | 25.0 | 46.6 | 46.6 | 43.3 | 40.0 | 45.3 | 40.0 | 45.2 | 39.3 | 40.9 |
| Organic Liquid: | | | | | | | | | | | |
| Dimerized Acid [7] | | | | | | | | | 4.0 | 7.3 | 6.2 |
| Trimerized Acid [14] | | | | | | | | 4.0 | 7.3 | | |
| Polystyrene [4] | 18.3 | 19.0 | | | | | | | | | |
| Polybutene [13] | | | 6.7 | 3.3 | | | | | | | |
| Polybutene [14] | | | | | 6.7 | 6.7 | | | | | |
| Polypropylene [12] | | | | | | | | | | | |
| Solvent Oil [10] | | | | | | | | | | | |
| White Oil [11] | | | | | | | | | | | |
| Test Results: | | | | | | | | | | | |
| Viscosity at 250° F., cp | 130 | 160 | 198 | 236 | 205 | 325 | 203 | 432 | 209 | 323 | 164 |
| Tensile at yield, p.s.i. [9] | 385 | 389 | 370 | 380 | 370 | 375 | 400 | 427 | 435 | 421 | 393 |
| Elongation, percent | 22.5 | 14.2 | 13.5 | 27.0 | 31.9 | 28.0 | 39.0 | 35.5 | 31.9 | 31.8 | 19.5 |
| Break Energy, ft. #/in.[3] | 2.2 | 1.4 | 1.3 | 2.9 | 3.2 | 2.9 | 4.3 | 4.2 | 3.7 | 3.6 | 1.9 |
| 180° Flex Number | 153 | 69 | 35 | 42 | 239 | 215 | 75 | 129 | 97 | 104 | 122 |
| Hardness at 110° F. (ASTM 1321) | 15 | 13 | 15 | 12 | 14 | 13 | 11 | 8 | 12 | 11 | 10 |

See footnotes at bottom of Table IV B.

TABLE IV-B

| Formulation No. | 47 | 48 | 49 | 50 | 51 | 52 | 53 | 54 | 55 | 56 |
|---|---|---|---|---|---|---|---|---|---|---|
| Paraffin Wax [1] | 83 | 83 | 83 | 83 | 83 | 83 | 83 | 83 | 83 | 83 |
| Microcrystalline Wax [2] | 17 | 17 | 17 | 17 | 17 | 17 | 17 | 17 | 17 | 17 |
| EVA Copolymer [3] | 15.7 | 16.6 | 20.0 | 16.3 | 18.7 | 16.6 | 20.0 | 16.6 | 15.0 | 17.0 |
| Polyethylene [15] | 6.7 | | | 3.3 | 4.0 | | | | 5.3 | 8.0 |
| Rosin Acid [8] | 30.5 | 43.3 | 36.7 | 40.7 | 34.0 | 46.0 | 41.3 | 46.0 | 40.3 | 35.0 |
| Organic Liquid: | | | | | | | | | | |
| Dimerized Acid [7] | 13.8 | | | | | | | | | |
| Trimerized Acid [14] | | | | | | | | | | |
| Polystyrene [4] | | | | | | | | | | |
| Polybutene [13] | | | | | | | | | | |
| Polybutene [14] | | | | | | | | | | |
| Polypropylene [12] | | 6.7 | 10.0 | 6.3 | 10.0 | | | | | |
| Solvent Oil [10] | | | | | | 4.0 | 5.3 | | 5.0 | 6.7 |
| White Oil [11] | | | | | | | | 4.0 | | |
| Test Results: | | | | | | | | | | |
| Viscosity at 250° F., cp | 161 | 181 | 312 | 178 | 233 | 180 | 350 | 184 | 161 | 193 |
| Tensile at yield, p.s.i. [9] | 351 | 351 | 375 | 349 | 339 | 399 | 411 | 389 | 402 | 418 |
| Elongation, percent | 10.0 | 22.5 | 24.3 | 22.8 | 12.4 | 36.6 | 27.4 | 38.3 | 19.9 | 13.0 |
| Break Energy, ft. –/in.[3] | 0.9 | 1.8 | 2.4 | 2.1 | 1.0 | 3.9 | 3.2 | 4.0 | 2.1 | 1.4 |
| 180° Flex Number | 67 | 237 | 128 | 151 | 73 | 195 | 489 | 191 | 75 | 157 |
| Hardness at 110° F. (ASTM 1321) | 11 | 13 | 13 | 11 | 11 | 12 | 12 | 12 | 11 | 10 |

[1], [2], [3], [7], [8], [9], as defined in Table I. [10], [11] as defined in Table III. [12] A viscous liquid propylene homopolymer having an average molecular weight of 1,120 and a viscosity at 100° F. of 69,000 SSU. [13] A viscous liquid butene homopolymer having an average molecular weight of 1,500 and a viscosity at 100° F. of 100,000 SSU. [14] A viscous liquid butene homopolymer having an average molecular weight of 2,500 and a viscosity at 100° F. of 715,000 SSU. [15] A solid polyethylene homopolymer having an average molecular weight of 2,000.

TABLE V-A

| Formulation No. | 57 | 58 | 59 | 60 | 61 | 62 | 63 |
|---|---|---|---|---|---|---|---|
| Parts: | | | | | | | |
| Wax | [1] 100 | [2] 100 | [5] 100 | [6] 100 | [6] 100 | [10] 100 | [12] 100 |
| Ethylene-vinyl Acetate Copolymer ([3]) | 11.5 | 12.5 | 12.5 | 7.5 | 7.5 | 7.5 | 9.3 |
| Rosin Acid ([8]) | 10.0 | 10.0 | 10.0 | 13.7 | 13.7 | 16.2 | |
| Transcinnamic Acid ([10]) | | | | | | | |
| Organic Liquid: | | | | | | | |
| Dimerized Acid ([7]) | | | | | 3.8 | | |
| Polystyrene ([4]) | | | | | | | |
| White Oil ([11]) | 2.5 | 2.5 | 2.5 | 3.8 | | 1.3 | |
| Test Results: | | | | | | | |
| Acid Number (ASTM D664-58) | 17.6 | 13.3 | 15.3 | 19.3 | 22.3 | 12.6 | <0.1 |
| Kinematic Viscosity at 250° F., cp | 120 | 115 | 160 | 60 | 63 | 63 | 63 |
| Tensile at break, p.s.i. ([9]) | 123 | 255 | 260 | 143 | 73 | 125 | |
| Tensile at yield, p.s.i. | 123 | 258 | 263 | 222 | 372 | 126 | |
| Elongation, percent | 9.1 | 8.9 | 9.8 | 30.6 | 41.2 | 19.0 | |
| Break Energy, ft. #/in.([3]) | 0.7 | 1.5 | 1.6 | 4.5 | 7.1 | 1.3 | |
| 180° Flex Number | | | | | | | 0 |
| Hardness at 110° F. (ASTM 1321) | 90 | 54 | 52 | 15 | 15 | 77 | |

See footnotes at bottom of Table V B.

TABLE V-B

| Formulation No | 64 | 64 | 66 | 67 | 68 | 69 |
|---|---|---|---|---|---|---|
| Parts: | | | | | | |
| Wax | [12] 199 | [13] 100 | [14] 100 | [14] 100 | [15] 100 | [16] 100 |
| Ethylene-vinyl Acetate Copolymer [3] | 7.3 | 29.0 | 16.7 | 20.0 | 30.0 | 8.3 |
| Rosin Acid [8] | | 21.4 | 33.4 | 31.3 | 20.0 | |
| Transcinnamic Acid [10] | 18.8 | | | | | |
| Organic Liquid: | | | | | | |
| Dimerized Acid [7] | | | | | | 25.0 |
| Polystyrene [4] | 18.8 | 10.8 | 16.7 | 15.3 | 11.7 | |
| White Oil [11] | | | | | | |
| Test Results: | | | | | | |
| Acid Number (ASTM D664–58) | 59.4 | 19 | 30 | 28 | 18 | 32.6 |
| Kinematic Viscosity at 250° F., cp | 67 | 600 | 200 | 284 | 600 | 34.2 |
| Tensile at break, p.s.i.[9] | | | | | | |
| Tensile at yield, p.s.i. | | 500 | 387 | 430 | | |
| Elongation, percent | | 13.5 | 22.8 | 27.2 | 53.0 | |
| Break Energy, ft. #/in.[3] | | 18.0 | 22.7 | 27.8 | 23.4 | |
| 180° Flex Number | 4 | 230 | 190 | 420 | 210 | 4 |
| Hardness at 110° F. (ASTM 1321) | | 12 | 14 | 12 | 16 | |

[1] An isoparaffin wax having a melting point of 145° F. (ASTM D-127)
[2] A mixture of waxes containing 75 pts. of a paraffin wax having a melting point of 152° F. (ASTM D-127) and 25 pts. of a microcrystalline wax having a melting point of 205° F. (ASTM D-127).
[3] and [4] As defined in Table I (3) and (4).
[5] A mixture of waxes containing 50 parts of a isoparaffin wax having a melting point of 145° F. (ASTM D-127) 25 pts. of a microcrystalline wax having a melting point of 205° F. (ASTM D-127) and 25 pts. of a microcrystalline wax having a melting point of 175° F. (ASTM D-127).
[6] A microcrystalline wax having a melting point of 205° F. (ASTM D-127).
[7], [8] and [9] as defined in Table I [7], [8] and [9].
[10] A microcrystalline wax having a melting point of 175° F. (ASTM D-127).
[11] As defined in Table III [11].
[12] A carnauba wax having a melting point of 210° F. (ASTM D-127).
[13] A wax blend containing 65 parts of a refined paraffin wax having a melting point of 150°–155° F. (ASTM D-87) and 35 parts of a microcrystalline wax having a melting point of 175° F. (ASTM D-127).
[14] A wax blend containing 83 parts of the paraffin wax and 17 parts of the microcrystalline was defined in [13].
[15] A wax blend containing 67 parts of the paraffin wax and 34 parts of the microcrystalline was defined in [13].
[16] A wax blend containing 90 parts of the paraffin wax and 10 parts of the microcrystalline was defined in [13].

TABLE VI

| Formulation No | 70 | 71 | 72 | 73 |
|---|---|---|---|---|
| Components in parts by weight: | | | | |
| Paraffin wax [1] | 90.5 | 77.8 | 90.0 | 90.0 |
| Microcrystalline wax [2] | 9.5 | 22.2 | 10.0 | 10.0 |
| Ethylene-vinyl acetate copolymer [3] | 33.0 | 36.8 | 50.0 | 50.0 |
| Polymer of styrene [4] | | 10.3 | 72.1 | |
| Dimerized 9,12-octadecadienoic acid [7] | | | | 68.0 |
| Disproportionated rosin [8] | | | 72.1 | 68.0 |
| Test Results: | | | | |
| Acid Number (ASTM D664–58) | <0.1 | <0.1 | 44.1 | 91.7 |
| Kin. Vis. at 250° F., cp | 2,150 | 2,160 | 1,730 | 1,690 |
| Tensile yield, p.s.i.[9] | 690 | 617 | 547 | 623 |
| Elongation, percent | 4.5 | 17.9 | 387.4 | 59.4 |
| Break energy, ft. lb./cu. in | 4.1 | 8.3 | 107.3 | 24.7 |
| 180° Flex No | 20 | 178 | 3,100 | 417 |

[1], [2], [3], [4], [7], [8], [9] as defined in Table I.

EXAMPLE IV

The formulations included in Table VII below serve to illustrate that additional property improvements of the compositions of this invention can be obtained by preparing the compositions according to the master-batch method rather than conventional methods. The compositions of formulation Nos. 74 and 76 were prepared conventionally by heating the wax to a temperature of 230° F. and adding thereto the polymer of styrene and carboxylic acid. A homogeneous mixture of these components was almost instaneously obtained with moderate stirring. The temperature of the homogeneous mixture was then raised to 25° F. and the ethylene-vinyl acetate copolymer was added gradually. The resulting mixture was stirred vigorously for about 1 hour at which time a homogeneous blend was obtained. Examples 75 and 77 were prepared by the master batch method. Accordingly a mixture of the polymer of styrene and carboxylic acid was heated to a temperature of 230° F. and with moderate stirring a homogeneous mixture of these components was almost instantaneously obtained. Thereupon the ethylene-vinyl acetate copolymer was added. The temperature was maintained between 275° F. and 300° F. and after stirring the mixture for about 10 minutes a homogeneous blend was obtained. The temperature of the mixture was then raised gradually to 400° F. over a 5 minute period and maintained at this temperature for about 2 minutes. The mixture was then cooled to about 250° F., added to the molten wax component and after a few minutes of stirring a homogeneous blend was obtained. The improved properties obtained by preparing the compositions of this invention by the master-batch method are evident from the test results indicated in Table VII below.

TABLE VII

| Formulation No | 74 | 75 | 76 | 77 |
|---|---|---|---|---|
| Components in parts by weight: | | | | |
| Paraffin wax [1] | 90.5 | 90.5 | 89.7 | 89.7 |
| Microcrystalline wax [2] | 9.5 | 9.5 | 10.3 | 10.3 |
| Ethylene-vinyl acetate copolymer [3] | 14.7 | 14.7 | 11.8 | 11.8 |
| Polymer of Styrene [4] | 22.0 | 22.0 | | |
| Disproportionated rosin [8] | 22.0 | 22.0 | 17.8 | 17.8 |
| Dimerized $C_{18}$ Fatty acid [7] | | | 17.8 | 17.8 |
| Test Results: | | | | |
| Kin. Vis. at 250° F., cp | 86.1 | 99.0 | 74.6 | 98.2 |
| Acid Number (ASTM D664–58) | 22.5 | 22.5 | 46.8 | 46.8 |
| Tensile yield, p.s.i.[9] | 457 | 571 | 557 | 639 |
| Elongation, percent | 19.3 | 38.5 | 8.7 | 17.7 |
| Break energy ft. lb./cu. in | 5.01 | 9.67 | 3.11 | 5.81 |
| 180° Flex No | 79 | 308 | 15 | 47 |

[1], [2], [3], [4], [7], [8], [9] as defined in Table I.

The compositions of this invention provide a number of advantages over prior art heat sealable laminating and coating compositions. The instant compositions have better barrier, protective, and other performance properties at relatively the same or lower viscosity values and are more economical. These improved properties can be obtained with lower concentrations of ethylene-vinyl acetate copolymer. In addition, these compositions can be prepared in less time and with lower heat and energy requirements than the prior art compositions.

Another advantage in the compositions of this invention is that they have properties that are truly plastic-like in nature. Compositions containing higher proportions of ethylene-vinyl acetate copolymer can be prepared without degradation and a high increase in melt viscosity. Futhermore the instant compositions which contain a relatively high proportion of wax, i.e., about 10 to 60 weight percent, have such plastic-like properties that they can be extruded and calendered into films and sheets or utilized in thermoplastic processes such as compression, injection or blow molding.

The compositions of this invention can be used to coat any type sheet materials such as paper, metal foil, corrugated carton or cardboard, wood panel, glass, etc. Suitable blends can also be formulated for coating tri- or polydimensional objects such as boxes, bags, etc. by routine curtain coating, dipping or spraying techniques. Compositions can be prepared having very low pick and blocking temperature in conjunction with excellent laminating properties thereby rendering them particularly desirable for present day packaging applications. A particularly preferred embodiment involves the coating of paperboard with the compositions of this invention.

I claim:
1. A composition comprising in parts by weight:
   (A) 100 parts of a wax having a melting point greater than 120° F.,
   (B) from 5 to 150 parts of an ethylene-vinyl acetate copolymer having a polymerized vinyl acetate content ranging from 5 to 35 weight percent and a melt index ranging from .1 to 1000,
   (C) in an amount sufficient to impart to the composition a total acid number ranging from 5 to 200, a non-corrosive acid component which is compatible with the wax and ethylene-vinyl acetate copolymer at the coating application temperatures; said component containing at least 35 percent by weight acid and at least 5 percent by weight liquid, all having boiling points greater than 300° F. at 7 millimeters of mercury, said acid being selected from the group consisting of:
   (1) an organic carboxylic acid which is a liquid at 70° F., has a viscosity at 100° F. ranging from 500 to 10,000 SSU, and average molecular weight ranging from 400 to 2500, and an acid number in excess of 20,
   (2) an organic carboxylic acid which has a melting point about 70° F., an average molecular weight ranging from 150 to 1500, and an acid number in excess of 20 and,
   (3) mixtures of (1) and (2)
   said liquids being selected from the group consisting of:
   (1) an organic carboxylic acid which is a liquid at 70° F., has a viscosity at 100° F. ranging from 500 to 10,000 SSU, and an average molecular weight ranging from 400 to 2500, and an acid number in excess of 20,
   (2) a hydrocarbon which is a liquid at 70° F. selected from the group consisting of:
      (a) an oil having a viscosity at 100° F. ranging from 300 to 3,000 SSU
      (b) a styrene polymer having a viscosity at 100° F. ranging from 800 to 100,000 SSU and an average molecular weight ranging from 300 to 3,000
      (c) a butene polymer containing at least 90 percent by weight butene, having a viscosity at 100° F. ranging from 1000 to 1,000,000 SSU and an average molecular weight ranging from 300 to 12,000
      (d) a propene polymer having a viscosity at 100° F. ranging from 10,000 to 1,000,000 SSU and an average molecular weight ranging from 800 to 3,500.
   (3) mixtures of (1) and (2).

2. A composition according to claim 1 wherein the wax is a petroleum wax.

3. A composition according to claim 1 wherein the ethylene-vinyl acetate copolymer has a polymerized vinyl acetate content ranging from 15 to 35 weight percent and a melt index ranging from 0.1 to 150.

4. A composition according to claim 1 wherein the liquid organic carboxylic acid of (C)-(1) is a dimerized fatty acid containing from 16 to 22 carbon atoms.

5. A composition according to claim 1 wherein the hydrocarbon oil of (C)-(2)-(a) is a refined white oil.

6. A composition according to claim 1 wherein the styrene polymer of (C)-(2)-(b) is a homopolymer having an average molecular weight ranging from 300 to 1500 and a viscosity at 100° F. ranging from 800 to 3500 SSU.

7. A composition according to claim 1 wherein the butene polymer of (C)-(2)-(c) is an isobutylene homopolymer having an average molecular weight ranging from 800 to 3000 and a viscosity at 100° F. of 10,000 to 200,000 SSU.

8. A composition according to claim 1 wherein the propene polymer of (C)-(2)-(d) is a homopolymer having an average molecular weight ranging from 1000 to 2000 and a viscosity at 100° F. ranging from 20,000 to 50,000 SSU.

9. A composition according to claim 1 wherein the solid organic carboxylic acid of (C)-(3) contains a major amount of abietic acid.

10. A composition according to claim 1 wherein the acid component of (C) is a mixture of liquid and non-liquid organic carboxylic acids.

11. A composition according to claim 10 wherein the acid component is a mixture containing dimerized fatty acids containing 16 to 22 carbon atoms and rosin acids.

12. A composition according to claim 1 wherein the acid component of (C) is a mixture containing a styrene polymer and rosin acids.

13. A composition according to claim 1 wherein the acid component of (C) is present in an amount sufficient to impart to the composition an acid number ranging from 10–75.

14. A composition according to claim 1 wherein:
   (A) the wax component is a blend containing from 20–80 parts paraffin wax and from 80–20 parts of a microcrystalline wax.
   (B) the ethylene-vinyl acetate copolymer has a polymerized vinyl acetate content ranging from 26 to 29 percent by weight, a melt index ranging from 0.1 to 25 and is present in an amount ranging from 5 to 100 parts.
   (C) The acid component is present in an amount sufficient to impart to the composition an acid number ranging from 10–75 and is a mixture comprising
      (1) from 70 to 95 percent by weight of rosin acids and
      (2) from 5 to 30 percent by weight of a styrene homopolymer having an average molecular weight ranging from 300 to 1500 and a viscosity at 100° F. ranging from 800 to 3500 SSU.

15. A composition according to claim 1 wherein:
   (A) the wax component is a blend containing from 20–80 parts paraffin wax and from 80–20 parts of of microcrystalline wax,
   (B) the ethylene-vinyl acetate copolymer has a polymerized vinyl acetate content ranging from 26 to 29 percent by weight, a melt index ranging from 0.1 to 25 and is present in an amount ranging from 5 to 100 parts,
   (C) the acid component is present in an amount sufficient to impart to the composition an acid number ranging from 10–75 and is a mixture comprising:
      (1) from 70 to 95 percent by weight of rosin acids
      (2) from 5 to 30 percent by weight of a dimer of 9,12-octadecadienoic acid.

16. A process for preparing homogeneous compositions comprising admixing:
   (A) a homogeneous blend prepared by combining at a temperature ranging from 250° F. to 400° F. of:
      (1) from 5 to 150 parts of an ethylene-vinyl acetate copolymer having a polymerized vinyl acetate content ranging from 5 to 35 weight percent and a melt index ranging from .1 to 1000 and,
      (2) in an amount sufficient to impart to the composition a total acid number ranging from 5 to 200, a non-corrosive acid component which is compatible with the wax and ethylene-vinyl acetate copolymer at the coating application temperature, said component containing at least 35% by weight acid and at least 5% by weight liquid, said acid and liquids having a boiling point greater than 300° F. at 7 millimeters of mercury and selected from the group consisting of:
  (a) an organic carboxylic acid which is a liquid at 70° F., has a viscosity at 100° F. ranging from 500 to 10,000 SSU, an average molecular weight ranging from 400 to 2500, and an acid number in excess of 20,
  (b) a hydrocarbon which is a liquid at 70° F. selected from the group consisting of:
    (1) an oil having a viscosity at 100° F. ranging from 300 to 3,000 SSU
    (2) a styrene polymer having a viscosity at 100° F. ranging from 1,000 to 100,000 SSU and an average molecular weight ranging from 300 to 3,000.
    (3) a butene polymer containing at least 90 percent by weight butene, having a viscosity at 100° F. ranging from 1000 to 1,000,000 SSU and an average molecular weight ranging from 300, to 12,000.
    (4) a propene polymer having a viscosity at 100° F. ranging from 10,000 to 1,000,000 SSU and an average molecular weight ranging from 800 to 3500.
  (c) an organic carboxylic acid which has a melting point above 70° F., an average molecular weight ranging from 150 to 1500, an acid number in excess of 20,
with
  (B) 100 parts of a molten wax at a temperature ranging from 150° F. to 275° F. and agitating until a homogeneous blend is obtained.

17. An article of manufacture coated with the composition of claim 1.

References Cited

UNITED STATES PATENTS

| | | | |
|---|---|---|---|
| 2,638,460 | 1/1951 | Crouch | 260—33.6 |
| 3,232,895 | 2/1966 | Klein et al. | 260—27 |
| 3,294,722 | 12/1966 | Apikos et al. | 260—28.5 |

DONALD E. CZAJA, *Primary Examiner.*

WILLIAM E. PARKER, *Assistant Examiner.*

U.S. Cl. X.R.

260—28.5, 33.6, 23; 161—235, 251

UNITED STATES PATENT OFFICE
CERTIFICATE OF CORRECTION

Patent No. 3,417,040                                    December 17, 19

Charles J. Kremer

It is certified that error appears in the above identified patent and that said Letters Patent are hereby corrected as shown below:

Column 15, line 28, "about" should read -- above --.

Signed and sealed this 10th day of March 1970.

(SEAL)
Attest:

Edward M. Fletcher, Jr.                        WILLIAM E. SCHUYLER, JR.
Attesting Officer                                         Commissioner of Patents